United States Patent [19]
Amini et al.

[11] Patent Number: 5,499,346
[45] Date of Patent: Mar. 12, 1996

[54] BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS

[75] Inventors: Nader Amini, Boca Raton; Patrick M. Bland, Delray Beach; Bechara F. Boury, Boca Raton; Robert T. Jackson, Boynton Beach, all of Fla.

[73] Assignee: International Business Machines Corporation, Armonk, N.Y.

[21] Appl. No.: 69,230

[22] Filed: May 28, 1993

[51] Int. Cl.[6] ................................................. G06F 11/00
[52] U.S. Cl. ................... 395/308; 395/185.02; 371/49.1
[58] Field of Search .................................... 395/575, 325; 371/49.1, 49.2

[56] References Cited

U.S. PATENT DOCUMENTS

4,388,684  6/1983  Nibby, Jr. et al. ...................... 395/575
5,155,735 10/1992  Nash et al. ............................. 395/325
5,257,391 10/1993  DuLac et al. .......................... 395/575
5,313,627  5/1994  Amini et al. ........................... 395/575

*Primary Examiner*—Jack B. Harvey
*Assistant Examiner*—David A. Wiley
*Attorney, Agent, or Firm*—Calfee, Halter & Griswold; R. S. Babayi

[57] ABSTRACT

An information processing system, comprising a central processing unit (CPU); a first system bus which connects the CPU to system memory so that the CPU can read data from, and write data to, the system memory; a second system bus connected to the CPU; a host bridge connecting the second system bus to a peripheral bus having at least one peripheral device attached thereto, the host bridge including register space for storing information related to transactions occurring over the peripheral bus; and error capture logic incorporated into the host bridge. The error capture logic monitors the transactions occurring over the peripheral bus, detects parity errors occurring during any of the transactions, and generates an interrupt routine over the second system bus to the CPU. The CPU reads the register space and performs necessary recovery operations.

15 Claims, 7 Drawing Sheets

| ADDR | REGISTER | | | | WRITE/READ | | | |
|---|---|---|---|---|---|---|---|---|
| 31 | | 16 | 15 | 0 | | | | |
| PCI BASE CONFIGURATION REGISTERS (100) | | | | | | | | |
| 00h | DEVICE ID | | VENDOR ID | | R | | R | |
| 04h | STATUS (104) | | COMMAND | | R | | W/R | |
| 08h | RESERVED | | | REVISION ID | R | R | R | R |
| 3Ch | RESERVED | | | | R | R | R | R |
| ⋮ | ⋮ | ⋮ | ⋮ | ⋮ | | | | |
| 3Ch | RESERVED | | | | R | R | R | R |
| PCI DEVICE SPECIFIC CONFIGURATION REGISTERS (102) | | | | | | | | |
| 50h | RESERVED | | | PCIC ENABLE | R | R | R | W/R |
| 54h | 106 FAILING ADDRESS | | | | R | R | R | R |
| 58h | 108 FAILING DATA 110 | | | | R | R | R | R |
| 5Ch | 112 ARBITRATION ID | | | ERROR STATUS | R | R | R | R |
| 60h | REQ0 PRIORITY | CPU PRIORITY | BANK1 MODE | BANK0 MODE | W/R | W/R | W/R | W/R |
| 64h | REQ4 PRIORITY | REQ3 PRIORITY | REQ2 PRIORITY | REQ1 PRIORITY | W/R | W/R | W/R | W/R |
| ⋮ | ⋮ | ⋮ | ⋮ | ⋮ | | | | |
| FFh | RESERVED | | | | R | R | R | R |

BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS

RELATED APPLICATIONS

The following United States patent applications are incorporated herein by reference as if they had been fully set out:

Application Ser. No. 08/068,882 Filed May 28, 1993 Entitled "METHOD AND APPARATUS FOR PROVIDING BACK-TO-BACK DATA TRANSFERS IN AN INFORMATION HANDLING SYSTEM HAVING A MULTIPLEXED BUS" (Further identified as Attorney Docket BC9-93-026);

Application Ser. No. 08/068,477 Filed May 28, 1993 Entitled "SYSTEM DIRECT MEMORY ACCESS (DMA) SUPPORT LOGIC FOR PCI BASED COMPUTER SYSTEM" (Further identified as Attorney Docket BC9-93-010);

Application Ser. No. 08/069,253 Filed May 28, 1993 Entitled "ARBITRATION LOGIC FOR MULTIPLE BUS COMPUTER SYSTEM RELATED APPLICATIONS" (Further identified as Attorney Docket BC9-93-011);

Application Ser. No. 08/070,134 Filed May 28, 1993 Entitled "METHOD AND APPARATUS FOR INITIALIZING MULTIPLE BUS NETWORKS IN AN INFORMATION HANDLING SYSTEM" (Further identified as Attorney Docket BC9-93-012);

Application Ser. No. 08/069,234 Filed May 28, 1993 Entitled "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM" (Further identified as Attorney Docket BC9-93-030); and Application Ser. No. 08/068,877 Filed May 28, 1993 Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS" (Further identified as Attorney Docket BC9-93-031).

BACKGROUND OF THE INVENTION

The present invention relates generally to error detection logic for computer systems and more particularly to an error detection and capture mechanism for detecting and capturing errors which occur over a peripheral bus in a multiple bus computer system.

Computer systems typically include more than one bus, each bus in the system having devices attached thereto which communicate locally with each other over the bus. Examples of the different types of buses present in typical computer systems are a system bus to which a host central processing unit is attached and one or more peripheral buses. System-wide communication over different buses is required, however, if a device attached to one bus needs to read or write information to or from a device on another bus. To permit system-wide communication between devices on different buses, bus-to-bus bridges (interfaces) are provided to match the communications protocol of one bus with that of another.

Known bus-to-bus bridges include those disclosed in the following co-pending patent applications assigned to the IBM Corporation: application Ser. No. 08/815,992 entitled "BUS CONTROL LOGIC FOR COMPUTER SYSTEM HAVING DUAL BUS ARCHITECTURE"; U.S. Pat. No. 5,313,627 issued May 17, 1994 entitled "PARITY ERROR DETECTION AND RECOVERY"; application Ser. No. 07/816,204 entitled "CACHE SNOOPING AND DATA INVALIDATION TECHNIQUE"; U.S. Pat. No. 5,255,374 issued Oct. 19, 1993 entitled "BUS INTERFACE LOGIC FOR COMPUTER SYSTEM HAVING DUAL BUS ARCHITECTURE"; application Ser. No. 07/816,691 entitled "BIDIRECTIONAL DATA STORAGE FACILITY FOR BUS INTERFACE UNIT"; U.S. Pat. No. 5,265,211 issued Nov. 23, 1993 entitled "BUS INTERFACE FOR CONTROLLING SPEED OF BUS OPERATION"; application Ser. No. 07/816,116 entitled "ARBITRATION CONTROL LOGIC FOR COMPUTER SYSTEM HAVING DUAL BUS ARCHITECTURE"; and application Ser. No. 07/816,698 entitled "METHOD AND APPARATUS FOR DETERMINING ADDRESS LOCATION AT BUS TO BUS INTERFACE", all filed on Jan. 2, 1992. These applications describe mechanisms which permit system-wide communication of devices attached to different buses in the system.

Each bus-to-bus bridge in a multi-bus computer system is used to connect two buses in the system. Various types of buses are available to construct a given computer system. One such bus which is becoming widely accepted is the PCI (Peripheral Component Interconnect) bus, which is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide", revision 0.6 published Nov. 1, 1992, and "Peripheral Component Interconnect (PCI) Add-in Board/Connector Addendum", (Draft) published 6 Nov. 1992; all by the PCI Special Interest Group, the contents of which references are incorporated herein by reference as if they were fully set forth.

Interfacing the PCI bus to other buses such as a host system bus in a computer system is problematic, however, if the communications protocols between the PCI bus and the host system bus are different. For example, although the PCI bus specification provides for PCI bus communications parity errors to be detected and reported over the PCI bus, no means exist for either recovering from these errors or for reporting these errors over the host system bus for management by the CPU.

It is an object of the present invention, then, to provide a mechanism for detecting and capturing errors which occur over a peripheral bus, such as a PCI bus, in a multiple bus computer system. It is a further object of the invention to provide a mechanism whereby such errors are reported over a host system bus, which is interfaced with the peripheral bus, for use in handling and recovering from the error conditions.

SUMMARY OF THE INVENTION

The present invention provides a PCI host bridge, for interfacing a PCI bus to a system bus in a multiple bus computer system, which (i) monitors an error signal line on the PCI bus for the occurrence of parity errors occurring during PCI bus cycles, (ii) captures information related to PCI bus cycles during which parity errors occur, and (iii) makes the captured information available to a CPU which is attached to the system bus.

The PCI host bridge resides intermediate the PCI bus and the system bus. Upon detection of the initialization of a PCI bus cycle, the PCI host bridge monitors the ensuing read or write transaction occurring over the PCI bus, and stores information relating to the cycle in host bridge registers. The stored information includes control and address information, arbitration identification of the device initiating the PCI bus cycle, and the data being transmitted across the PCI bus. If, during the PCI cycle, a PCI device detects a parity error related to a particular bus cycle, the PCI host bridge is notified of the event.

Once an error is detected by the PCI host bridge, the information stored in the host bridge registers is precluded from being updated. The host bridge generates an interrupt routine over the system bus to which the CPU responds. Because information relating to the faulty transaction is stored in the host bridge, the CPU may investigate the source of the error and use the stored information for performing recovery operations. The logic required to implement the error detection and capture mechanism, to provide error recovery support for the CPU, is an algorithm implemented on the PCI host bridge.

DETAILED DESCRIPTION OF THE PREFERRED EMBODIMENT

Figure 1A:
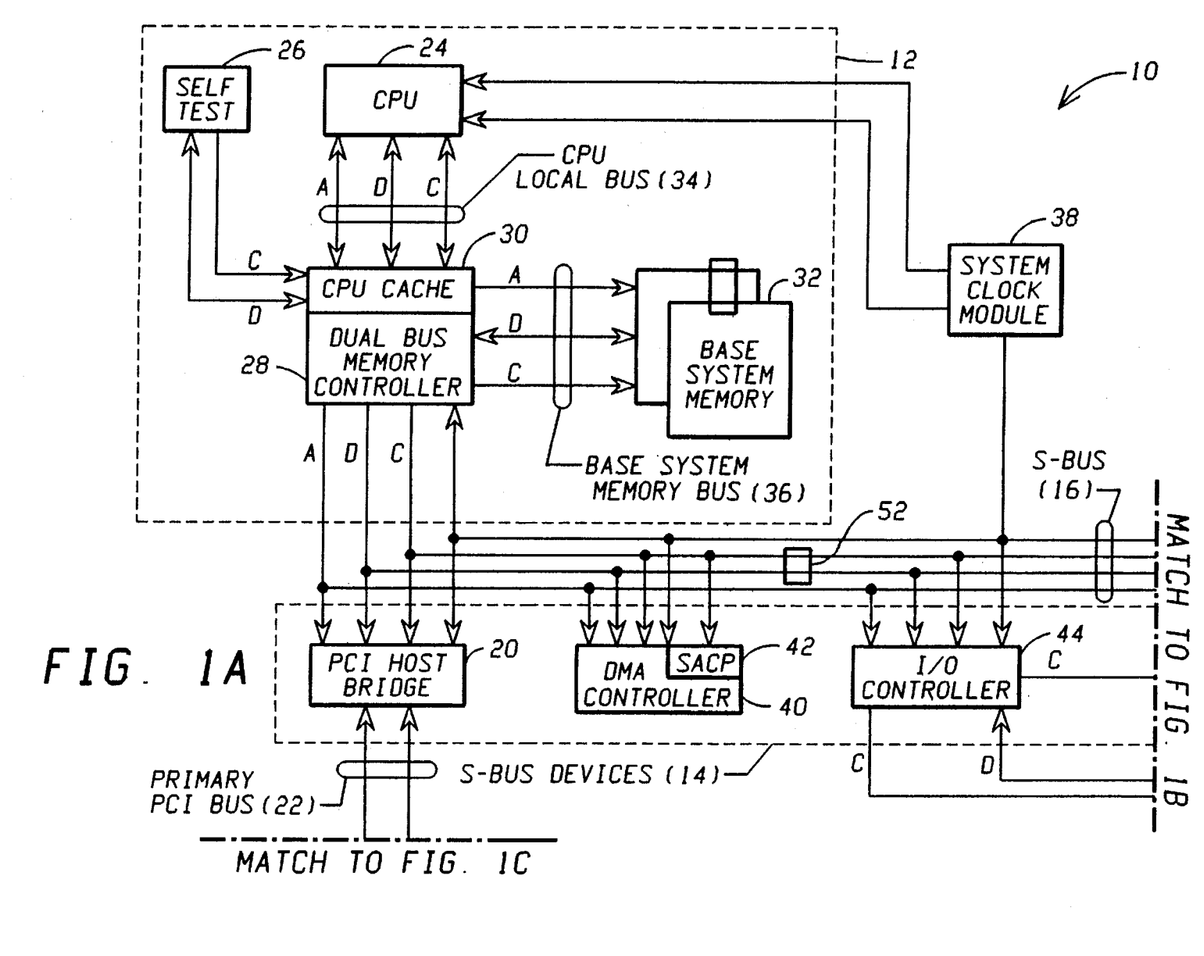
FIGS. 1A–1C are blocks diagram of an information handling system constructed according to the principles of the present invention.
Figure 1B:
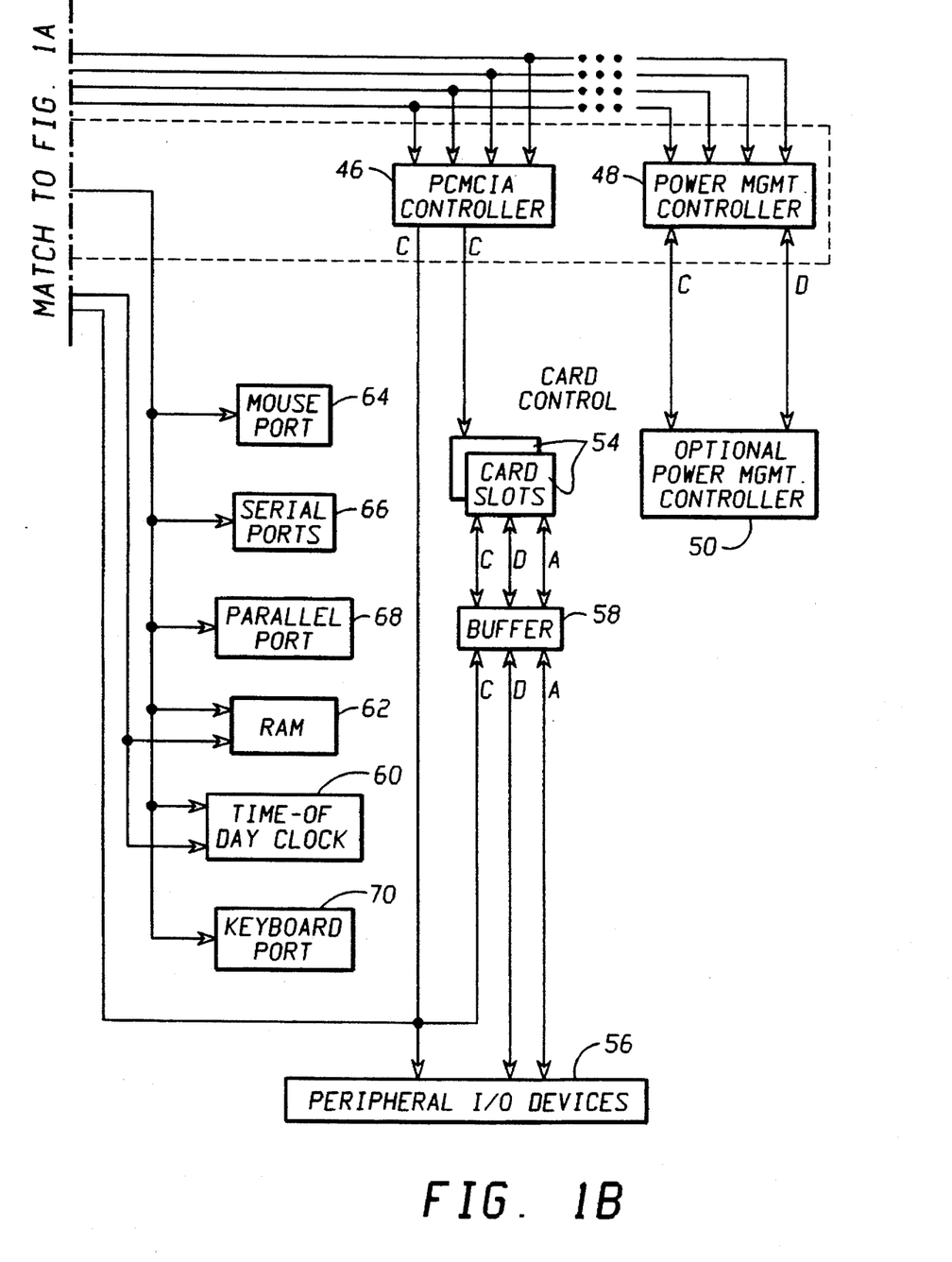
Figure 1C:
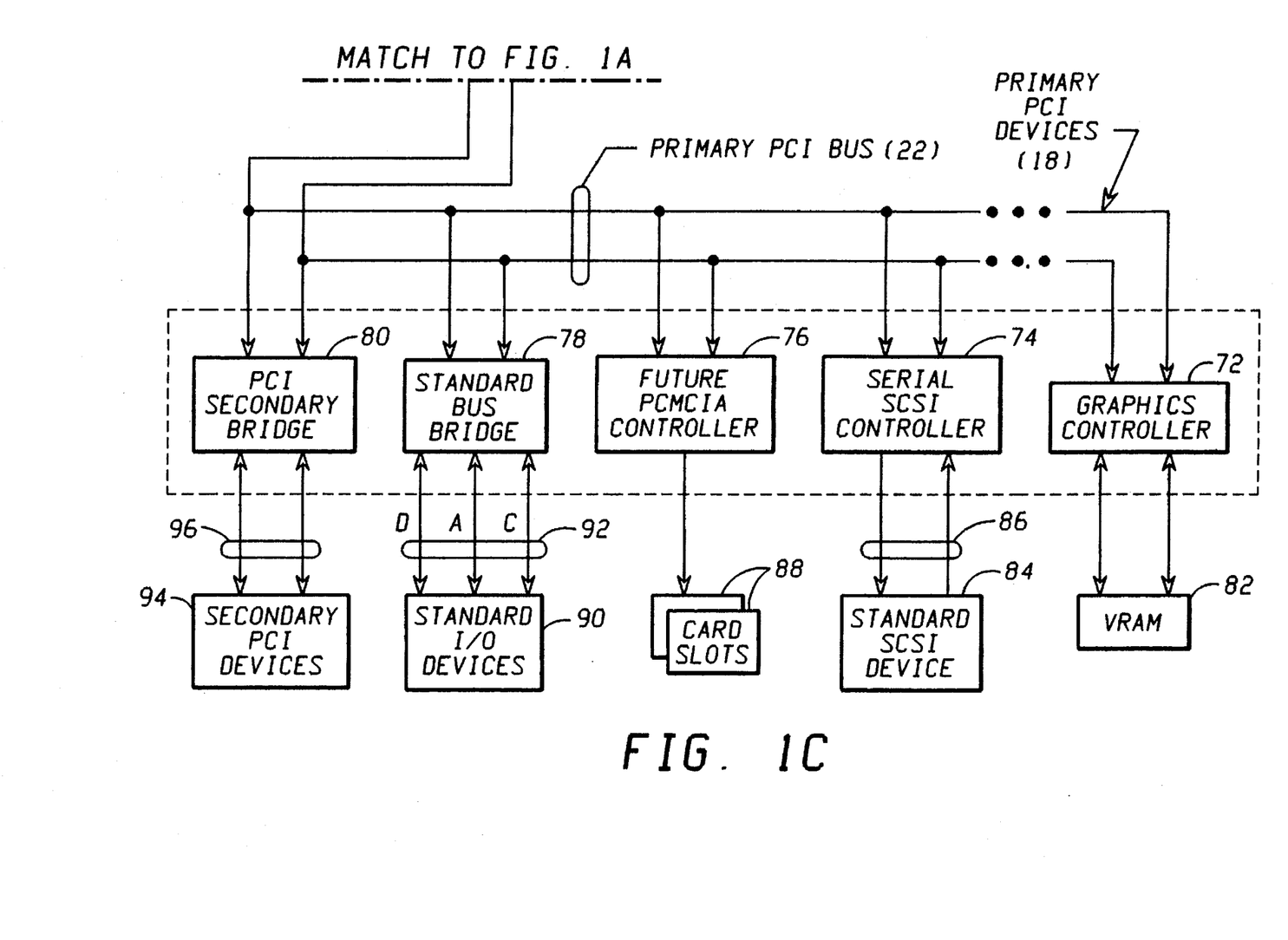

Referring now to FIGS. 1A–1C, a multi-bus information handling system 10 is shown generally at 10, comprising, (i) a processor, cache and memory complex 12 connected to S-bus (system bus) devices 14 via an S-bus 16 and (ii) primary PCI devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIGS. 1A–1C will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc under the trade designation i486™, although it is contemplated that the system 10 may be implemented using other types of CPUs, especially other x86-type microprocessors. The self-test circuit 26 provides a built-in-self-test (BIST) feature for the CPU 24 upon power-up. The self-test circuit also controls any self-test features which may be incorporated within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by an S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths ("D", "A", and "C" in FIGS. 1A–1C) as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM, not shown) which is used to temporarily stores address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle, the memory controller does not pass information onto the S-bus. However, if the memory controller determines that the operation it is managing is an I/O cycle, the memory controller propagates the information onto the S-bus for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIGS. 1A–1C, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 48 in case more sophisticated power management control is desired. A buffer 52 is provided on the S-bus 16 intermediate the DMA controller 40 and the I/O controller 44. As shown in FIGS. 1A–1C, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may be attached to these buses.

The PCI host bridge 20 is a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIGS. 1A–1C, these devices may include a graphics controller 72, a serial SCSI (small computer systems interface) controller 74, a future PCMCIA controller 76, a standard I/O bus (e.g., ISA or MICRO CHANNEL® ("MC-A")) bridge 78 (also referred to herein as an expansion bridge), and a PCI secondary bridge 80. The devices shown in FIGS. 1A–1C attached to the primary PCI bus, however, are only one example of a system implementing a PCI bus architecture and thus the disclosed exemplary configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22. Secondary PCI devices 94 are connected to PCI secondary bridge 80 via secondary PCI bus 96. Any number of unidentified secondary PCI devices 94 may then be connected to the secondary PCI bus 96. The PCI secondary bridge 80 serves as an interface between the secondary PCI devices 94 attached to the secondary PCI bus 96, and the primary PCI bus 22.

Data is communicated between PCI devices which reside on PCI buses in the system over those PCI buses (e.g. primary PCI bus 22 and secondary PCI bus 96). Data transactions include read or write operations initiated by a PCI device acting as a master on the bus to or from a PCI device acting as a slave (target) on the bus. Parity on the PCI bus 22 provides a mechanism to determine transaction by transaction if a master PCI device on the PCI bus is successful in addressing a target PCI device on the bus, and if data is correctly transferred between the two devices.

Generating parity is non-optional; it must be performed by all PCI compliant devices. The target device for a particular PCI transaction checks parity and reports an address parity error. Thus, address parity errors are detected and reported by the slave PCI device in a PCI transaction. With respect to data parity errors, the master PCI device detects and reports data parity errors for a particular read transaction, while the slave (target) PCI device detects and reports data parity errors for a particular write transaction. A master PCI device, however, has the ability to detect an error whether it or a slave generated the error. The PCI bus 22 provides a PERR# line which is used by a PCI device to report these data parity errors over the bus. The host bridge 20 has the ability to act as either a slave or a master on the PCI bus and thus can also generate a PERR# signal.

The present invention provides a mechanism whereby the PERR# signal on the PCI bus is detected and used to support recovery operations by the CPU 24 on the S-bus 16. Control and address information, arbitration identification of the device initiating the PCI bus cycle, and the data being transmitted across the PCI bus during the cycle are temporarily stored in the PCI host bridge 20. Upon detecting an active PERR# signal over the PCI bus, the host bridge 20 (or on any other PCI bridge in the system, such as PCI secondary bridge 80), generates an interrupt routine over the S-bus 16 to which the CPU responds. Because information relating to the faulty transaction is stored (captured) in the host bridge, the CPU may investigate the source of the error and use the stored information for performing recovery operations.

In PCI bus architecture, each PCI device (including PCI host bridge 20 in FIGS. 1A–1C) is provided with configuration space consisting of 256 bytes of register space. The configuration space of each peripheral device and bridge contains the data used by the overall configuration software in the system to create an address map to be used during normal communications. Accordingly, when the CPU 24 initially runs the configuration software, it accesses and reads or writes to the configuration space of each device or bridge to configure the system and create the address map. A complete description of the configuration space in the PCI bridge is provided in applicants' co-pending application entitled "METHOD AND APPARATUS FOR INITIALIZING MULTIPLE BUS NETWORKS IN AN INFORMATION HANDLING SYSTEM".

Figure 2:
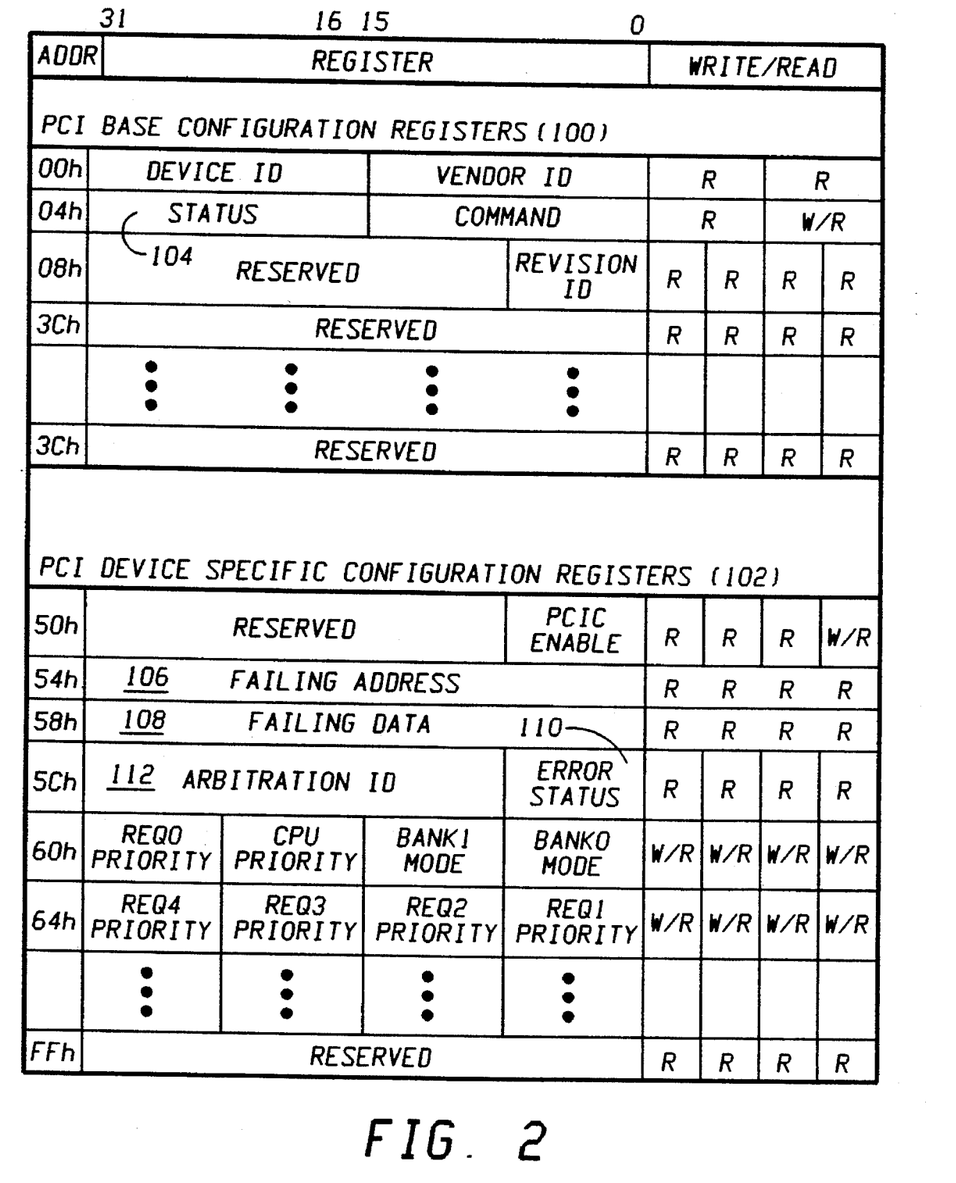
FIG. 2 is a map of the configuration space provided by configuration registers in each of PCI devices of FIG. 1.

Each PCI device in the system, including the PCI host bridge 20, is provided with the above-described configuration space. As shown in FIG. 2, this configuration space includes PCI base configuration registers 100 and PCI device specific configuration registers 102. Inclusion of the PCI base configuration registers 100 is mandatory in each of the PCI devices in the system. The PCI device specific configuration registers 102 are optional for PCI devices in the system.

Individual registers in the PCI base configuration registers 100 and PCI device specific configuration registers 102 are used to support the error detection and capture mechanism of the present invention. Each of the PCI devices in the system includes a status register 104 at address 04h in the base configuration registers 100. The status register 104 is a 16-bit register. Bit 15 of the register is set by the PCI device on which the status register resides when an error is detected in a PCI bus transaction in which the device is involved. The device detecting the error also activates the PERR# line on the PCI bus simultaneously with setting bit 15 in its register.

The individual registers in the PCI device specific configuration registers 102 which are used to support the error detection and capture mechanism are failing address register 106 (address 54h), failing data register 108 (address 58h), and error status and arbitration identification registers 110 and 112, respectively (address 5Ch). These registers are so dedicated only in the PCI host bridge 20. The failing address and failing data registers are 32-bit registers, the error status register is an 8-bit register, and the arbitration identification register is a 24-bit register.

Figure 3:
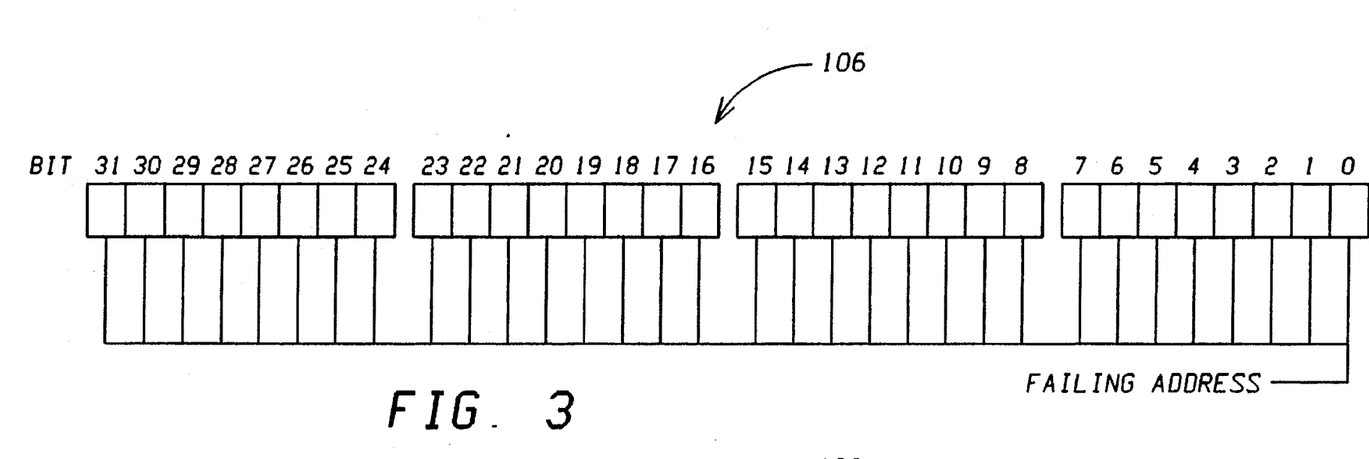
FIG. 3 is a map of the field of an address register in the PCI host bridge of FIG. 1.
Figure 4:
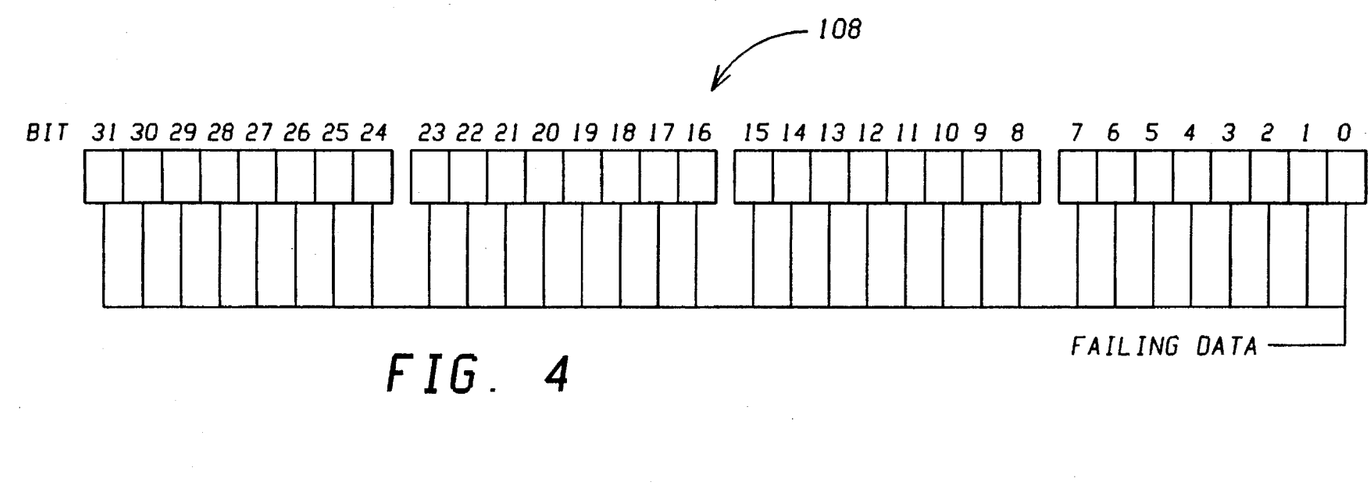
FIG. 4 is a map of the field of a data register in the PCI host bridge of FIG. 1.

These registers are used to store in the PCI host bridge 20 control and address information, arbitration identification of the device initiating the PCI bus cycle, and the data being transmitted across the PCI bus during the cycle. FIGS. 3–6, respectively, are maps of the fields of the failing address register 106, the failing data register 108, the error status register 110, and the arbitration identification register 112. FIG. 3 shows the 32-bit address field of the failing address register 106, the contents of which identify the address of a target PCI device generated by a master in a particular PCI bus cycle. FIG. 4 is the 32-bit data field of the failing data register 108, which is filled with the data to be transmitted during the PCI cycle.

Figure 5:
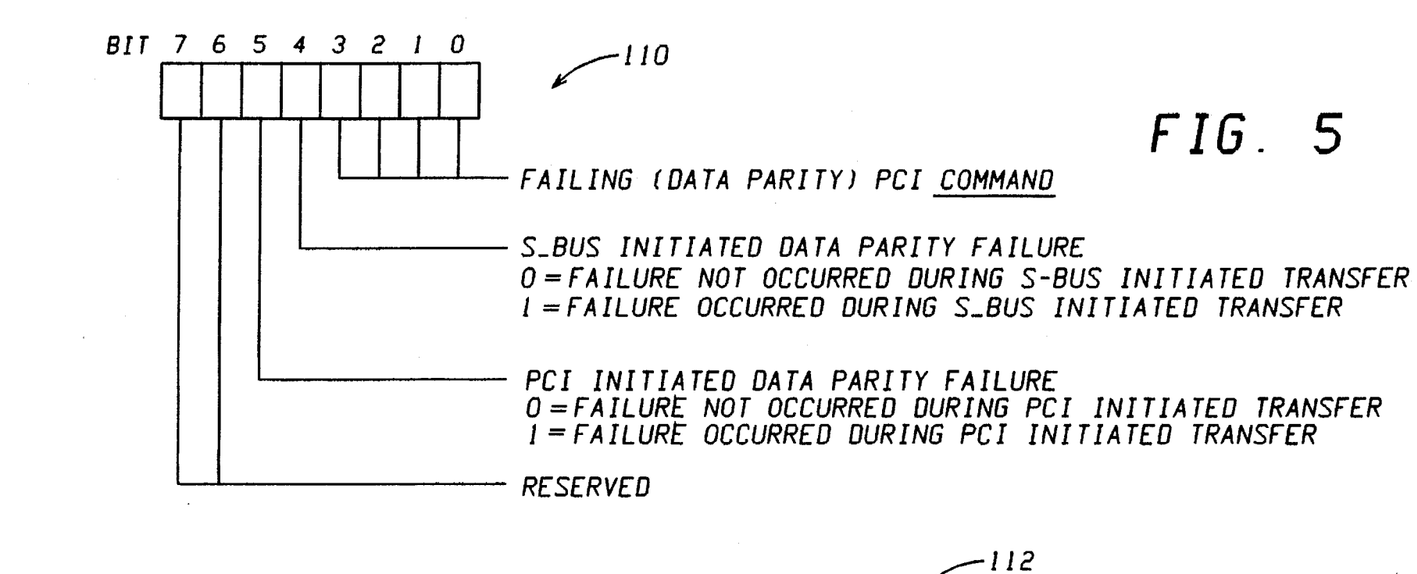
FIG. 5 is a map of the field of an error status register in the PCI host bridge of FIG. 1.
Figure 6:
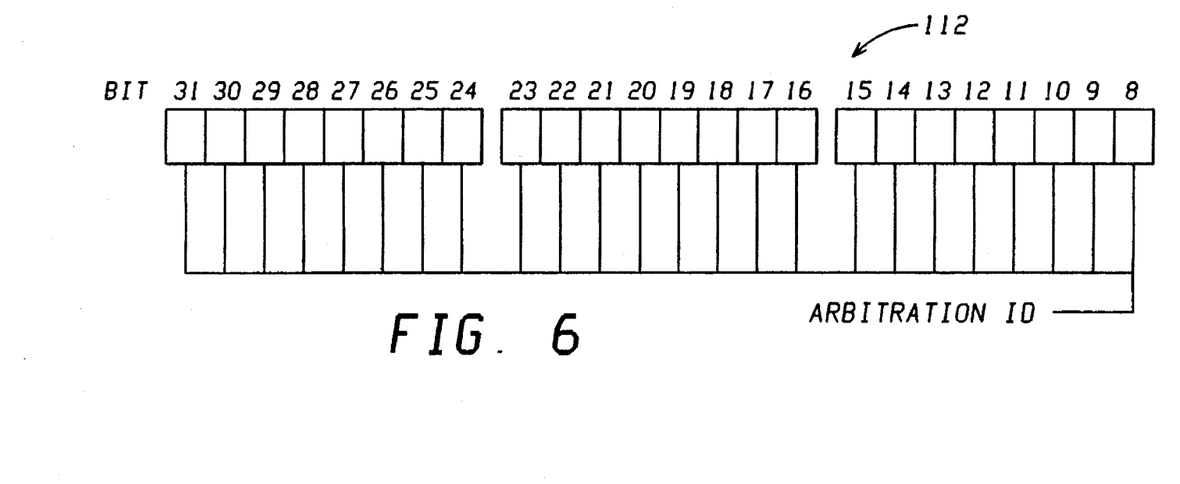
FIG. 6 is a map of the field of an arbitration identification register in the PCI host bridge of FIG. 1.

FIG. 5 shows the six bits (0–5) of the 8-bit error status register 110 which contain control information relating to a PCI bus cycle. Bits 0–3 contain command information, and bits 4 and 5 indicate whether a PCI bus cycle during which a parity error was detected was initiated over the S-bus 16 or the PCI bus 22. FIG. 6 illustrates the 24-bit arbitration identification register 112 which contains the arbitration identification of the device which initiated the PCI cycle.

The PCI host bridge, residing intermediate the PCI bus 22 and the S-bus 16, monitors activity on the PCI bus. Upon detection of the initialization of a PCI bus cycle or transaction, the PCI host bridge 20 monitors the ensuing read or write transaction occurring over the PCI bus, including the PERR# line. Information relating to the transaction is stored in the PCI host bridge in the failing address register 106, the failing data register 108, the error status register 110 and the arbitration identification register 112. If, during the PCI cycle, a PCI device detects an error related to a particular bus transaction and activates the PERR# line on the PCI bus, the PCI host bridge 22 is notified of the event. The PCI device detecting the error simultaneously sets bit 15 in its status register 104 with activation of the PERR# line. The host bridge 20 sets bit 15 in its own status register 104 and activates the PERR# line if it is involved in a PCI transaction and detects a parity error.

Activation of the PERR# line inhibits updating of the information stored in the failing address register 106, the failing data register 108, the error status register 110 and the arbitration identification register 112. The captured contents of these registers is made available to the CPU 24 over the S-bus for possible recovery operations.

Figure 7:
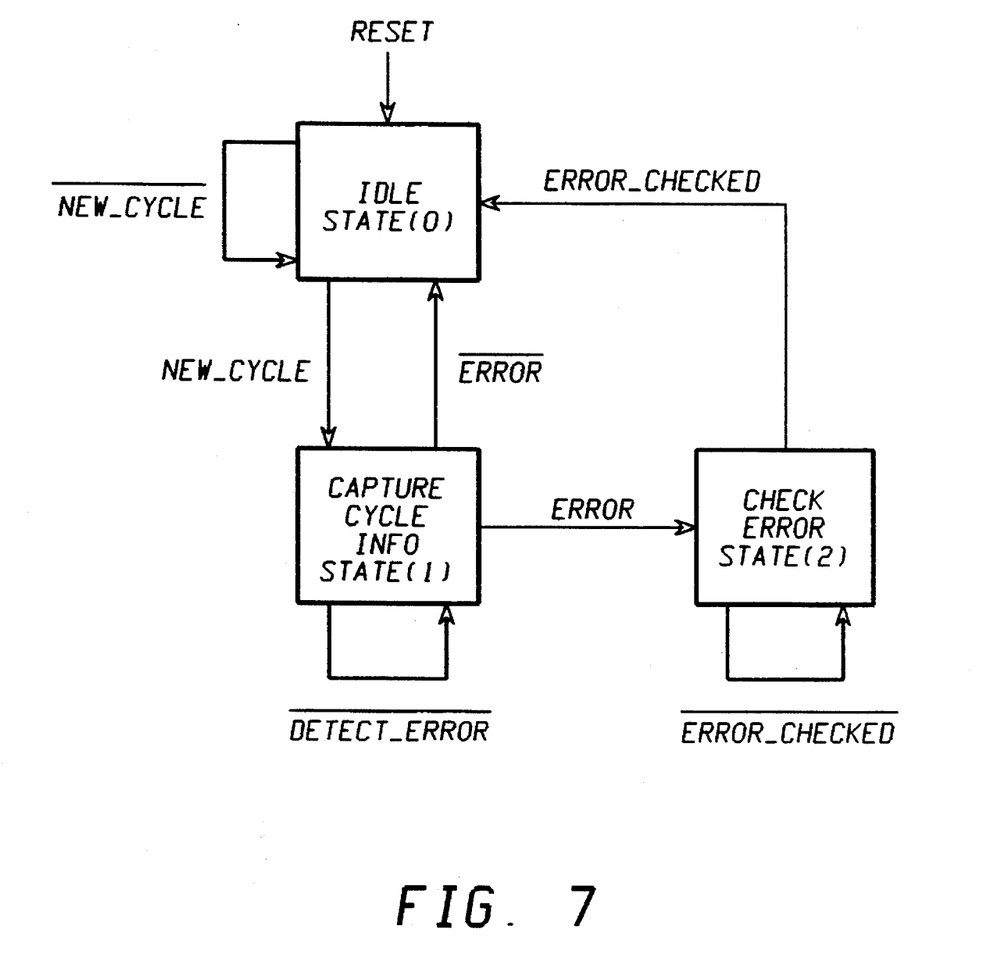
FIG. 7 is a state diagram representation of the logic implemented on the PCI host bridge of FIG. 1 required to provide the error detection and capture mechanism of the present invention.

The logic required to implement the error detection and capture mechanism described above, to provide error recovery support for the CPU 24, is an algorithm implemented on the PCI host bridge 20, the operation of which conforms to the state diagram of FIG. 7. The algorithm state diagram represents three states: state(0), state(1), and state (2). State(0) is the IDLE state during which the PCI host bridge 20 waits for a NEW_CYCLE to begin on the PCI bus. If no NEW_CYCLE is detected, the host bridge remains in the IDLE state, continuing to monitor bus activity for the start of a NEW_CYCLE.

If, however, a NEW_CYCLE is detected, indicating the start of a PCI bus read or write cycle, the PCI host bridge algorithm enters state(1). During state(1), all of the information relating to the transfer (control, address, and data information, and the arbitration ID of the PCI device initiating the transfer) is captured and stored in register addresses 54h, 58h, and 5Ch in the device specific configuration registers 102. As long as no ERRORS are detected during the cycle, the host bridge remains in state(1). Upon completion of the entire PCI cycle, if no ERROR has been detected, the host bridge re-enters state(0). Upon detection of the next PCI cycle, all of the information relating to the transfer is again captured and rewritten over the information corresponding to the previous PCI cycle in register addresses 54h, 58h, and 5Ch.

If, during state(1), a PCI device activates the PERR# line on the PCI bus, indicating that an error related to the transaction has occurred, the host bridge enters state(2). The host bridge (i) locks the information present in register addresses 54h, 58h, and 5Ch in the device specific configuration registers 102 in response to the PERR# signal, and (ii) generates an HBFFC software interrupt routine over the S-bus 16.

The CPU 24 responds to the HBFFC interrupt by requesting and being granted access to the PCI bus to investigate the reported error. First the CPU 24, having control of the PCI bus, looks at bit 15 of the status register in the base configuration registers 100 of the master PCI device which initiated the cycle during which the error was detected. Because a master PCI device has the ability to detect an error whether it or a slave generated the error, the master will always set its bit 15 when an error is detected.

However, some PCI devices have built-in error correction capabilities, wherein a master device on a particular PCI transaction will retry a cycle if an error is detected. For example, if a master PCI device initiates a write operation, and the target slave device generates and error, master device can detect this error and initiate a retried transfer. If such is the case, and if the master PCI device is successful in retrying the cycle, it will clear bit 15 in its status register. In fact, if the error is detected and the retried cycle is completed quick enough, the master PCI device may never even set its bit 15 and thus there will be no need to clear it. Master PCI devices typically retry PCI transactions on the order of nanoseconds, and the CPU typically takes on the order of microseconds to obtain control of the PCI bus. Thus, by the time the CPU looks at bit 15 of the status register in the master PCI device which initiated the cycle, to determine if the master PCI device has performed recovery operations on its own, either the recovery has occurred or it will not occur. Register addresses 54h, 58h, and 5Ch are then not updated until the CPU takes appropriate action.

If the PERR# line has been activated, but bit 15 in the master PCI device status register is not set by the time the CPU reads it, the CPU determines that the master has recovered and clears bit 15 from the target PCI device if it has been set (ERROR_CHECKED). The host bridge then enters the IDLE state, awaiting the start of the next PCI cycle.

If bit 15 in the status register of the master PCI device initiating the transfer is set, however, the CPU determines that the error can not be or has not been corrected by the master PCI device and that the CPU itself must take some type of corrective action, such as retrying the transfer over the PCI bus. The CPU then reads the contents of register addresses 54h, 58h, and 5Ch in the device specific configuration registers 102 of the host bridge (which has been locked by the host bridge upon entering state(2) and since not updated) to obtain all of the information related to the failing PCI transfer necessary to retry the transfer. The CPU clears bit 15 from the master PCI device status register, and also clears bit 15 from the PCI slave device if it too has been set (ERROR_CHECKED). The host bridge enters the IDLE state, awaiting the start of the next PCI cycle.

Accordingly, the preferred embodiment of an error detection and capture mechanism for detecting and capturing errors which occur over a peripheral bus in a multiple bus computer system has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information processing system, comprising:

a system bus having connected thereto a central processing unit (CPU);

a peripheral bus having connected thereto a master peripheral device which initiates transactions over said peripheral bus in which data is transferred between said master peripheral device and a slave peripheral device connected to said peripheral bus, said master peripheral device able to detect parity errors occurring during said transactions, set a status register and re-initiate transactions if a parity error is detected, and reset said status register if a re-initiated transaction is successfully transacted without an occurrence of a parity error;

a host bridge connecting said system bus to said peripheral bus for simultaneously monitoring said transactions as they occur over said peripheral bus, said host bridge including register space for temporarily storing the identification of a master peripheral device initiating a transaction and said data being transmitted over said peripheral bus between said master peripheral device and said slave peripheral device during the transaction; and logic for saving said data and identification information in said host bridge register space and generating an interrupt routine over said system bus to said CPU, in response to detection of a parity error over said peripheral bus, wherein said CPU gains access to said peripheral bus in response to said interrupt routine and alternatively (a) reads said register space in said host bridge and attempts recovery operations over said peripheral bus if said status bit is set or (b) relinquishes control of said peripheral bus if said status bit is not set, indicating that a re-initiated transaction has been successfully transacted by said master peripheral device without an occurrence of a parity error.

2. The system of claim 1, wherein said peripheral bus conforms to Peripheral Component Interconnect (PCI) architecture.

3. The system of claim 2, wherein said parity errors are detected by monitoring with said host bridge an error status line on said peripheral bus which is activated by said master peripheral device, and wherein said logic for saving said data and said identification information includes logic for inhibiting said register space from being updated in response to activation of said error status line.

4. The system of claim 2, wherein said register space has additionally stored therein control and address information.

5. The system of claim 2, wherein said peripheral bus and said system bus have data widths of at least 32 bits.

6. A parity error detection and recovery mechanism for use in a computer system which comprises (i) a system bus having connected thereto a central processing unit (CPU); (ii) a peripheral bus having connected thereto a master peripheral device which initiates transactions over said peripheral bus in which data is transferred between said master peripheral device and a slave peripheral device connected to said peripheral bus, said master peripheral device able to detect parity errors occurring during said transactions and re-initiate a transaction if a parity error is detected; and (iii) a host bridge connecting said system bus to a peripheral bus for simultaneously monitoring said transactions as they occur over said peripheral bus; said parity error detection and recovery mechanism comprising:

a status register which is set by said master peripheral device upon detection of a parity error occurring during a transaction, and which is reset by said master peripheral device if a re-initiated transaction is successfully transacted without an occurrence of a parity error;

register space in said host bridge for temporarily storing the identification of a master peripheral device initiating a transaction and said data being transmitted over said peripheral bus between said master peripheral device and said slave peripheral device during the transaction; and logic for saving said data and identification information in said host bridge register space and generating an interrupt routine over said system bus to said CPU, in response to detection of a parity error over said peripheral bus, wherein said CPU gains access to said peripheral bus in response to said interrupt routine and alternatively (a) reads said register space in said host bridge and attempts recovery operations over said peripheral bus if said status bit is set or (b) relinquishes control of said peripheral bus if said status bit is not set, indicating that a re-initiated transaction has been successfully transacted by said master peripheral device without an occurrence of a parity error.

7. The mechanism of claim 6, wherein said peripheral bus conforms to Peripheral Component Interconnect (PCI) architecture.

8. The mechanism of claim 7, wherein said parity errors are detected by monitoring with said host bridge an error status line on said peripheral bus which is activated by said master peripheral device, and wherein said logic for saving said data and said identification information includes logic for inhibiting said register space from being updated in response to activation of said error status line.

9. The mechanism of claim 7, wherein said register space has additionally stored therein control and address information.

10. The mechanism of claim 7, wherein said peripheral bus and said system bus have data widths of at least 32 bits.

11. A method of detecting and recovering from parity errors in a computer system which comprises (i) a system bus having connected thereto a central processing unit (CPU); (ii) a peripheral bus having connected thereto a master peripheral device which initiates transactions over said peripheral bus in which data is transferred between said master peripheral device and a slave peripheral device connected to said peripheral bus, said master peripheral device able to detect parity errors occurring during said transactions and re-initiate a transaction if a parity error is detected; and (iii) a host bridge connecting said system bus to a peripheral bus for simultaneously monitoring said transactions as they occur over said peripheral bus; said method comprising the steps of:

temporarily storing in register space in said host bridge the identification of a master peripheral device initiating a transaction and said data being transmitted over said peripheral bus between said master peripheral device and said slave peripheral device during the transaction;

detecting a parity error in the transaction;

setting a status register with said master peripheral device which has initiated the transaction in response to the detection of a parity error;

generating an interrupt routine over said system bus to said CPU;

allowing said CPU to gain access to said peripheral bus in response to said interrupt routine; and alternatively (a) reading said register space in said host bridge and attempting recovery operations over said peripheral bus by said CPU if said status bit is set or (b) relinquishing control of said peripheral bus by said CPU if said status bit is not set, indicating that a re-initiated transaction has been successfully transacted by said master peripheral device without an occurrence of a parity error.

12. The method of claim 11, wherein said peripheral bus conforms to Peripheral Component Interconnect (PCI) architecture.

13. The method of claim 12, wherein said step of detecting a parity error is accomplished by monitoring with said host bridge an error status line on said peripheral bus which is activated by said master peripheral device, and wherein the step of storing in register space includes the step of inhibiting said register space from being updated in response to activation of said error status line.

14. The method of claim 12, wherein said register space has additionally stored therein control and address information.

15. The method of claim 12, wherein said peripheral bus and said system bus have data widths of at least 32 bits.

* * * * *